Nov. 3, 1970 J. ORTHEIL 3,537,737

JOINT ASSEMBLAGE FOR USE IN SUSPENSION SYSTEMS OF MOTOR VEHICLES

Filed Dec. 24, 1968

INVENTOR
JOHANNES ORTHEIL

BY Holman, Glascock, Downing & Seebold
ATTORNEYS $\beta = 130^\circ$
$\gamma = 80^\circ$
$\alpha = 40^\circ$
$\varepsilon = 50^\circ$

INVENTOR
JOHANNES ORTHEIL

BY Holman, Glascock, Downing & Seebold
ATTORNEYS

United States Patent Office 3,537,737
Patented Nov. 3, 1970

3,537,737

JOINT ASSEMBLAGE FOR USE IN SUSPENSION SYSTEMS OF MOTOR VEHICLES

Johannes Ortheil, Anrath, Germany, assignor to Langen & Co., Dusseldorf, Germany Filed Dec. 24, 1968, Ser. No. 786,714
Int. Cl. B60d *3/18*
U.S. Cl. 287—88 4 Claims

ABSTRACT OF THE DISCLOSURE

A joint assemblage particularly for suspension systems of motor vehicles for transmitting, especially pressures between linkage components which can be turned relative to each other through small angles in which the transmission or transfer of the forces is effected via convex bearing bodies provided at the ends of the linkage components which roll off or slide on opposite surfaces and a common guide element capable of being turned through larger angles relative to the linkage components is operably related to such components.

BACKGROUND OF THE INVENTION

As is known, ball joints are frequently employed for the suspension of wheel supports on double cross or transverse guide rods and the support of one of the guide rods respecting the chassis by means of a shock absorber unit is similarly effected by a ball and socket joint. While the angles between the directions of the forces can be very small in the two ball and socket joints and do not change substantially during contraction and expansion, a relatively great movement develops between the bearing parts secured on the guide rod and those secured on the wheel support and shock absorber unit, respectively. In view of the fact that the weight of the motor vehicle is transmitted over these ball and socket joints to the wheels, considerable frictional forces must be overcome and these frictional forces result in an undesired wear as well as reduce the sensitivity of the suspension system.

SUMMARY OF THE INVENTION

This invention relates to a joint assembage particularly for suspension systems of motor vehicles and the object of the invention is to overcome the above mentioned objectionable characteristics namely, to reduce the frictional forces and prevent relative movements between highly loaded bearing components.

According to the invention, the problem is solved by the provision of a joint of the above mentioned type in such a manner that the bearing bodies of the linkage components roll off or slide on one another with the linkage components being provided with convex, spherical guide faces constituting parts of the surface of an imaginary sphere and which guide faces are partly embraced by corresponding concave spherical guide faces in the guide element.

By virtue of the present invention, the wear is reduced to a minimum in view of the fact that the bearing bodies only move through relatively small angles respecting each other and the frictional forces and as a consequence, the wear between the guide element and the bearing bodies are likewise low since only guiding forces develop. Inasmuch, unlike in the customary suspension arrangement equipped with two joints, as only a single joint is employed for transmitting the wheel forces directly to the shock absorber unit, the cross guide rod can also be weaker. While such a joint could only move with complete freedom from play by a deformation of some components, it was ascertained in practical tests that sufficient mobility for the above referred to small angular deviations between the linkage components is assured even with the play present in normal production items. The esay movement of the joint can be further augmented by fabricating the portion of the guide element supporting the guide faces of a plastic material, such as for example, teflon.

Additional important objects and advantages of the invention will become more readily apparent from the following detailed description and annexed drawing:

DETAILED DESCRIPTION OF THE INVENTION

Figure 1:
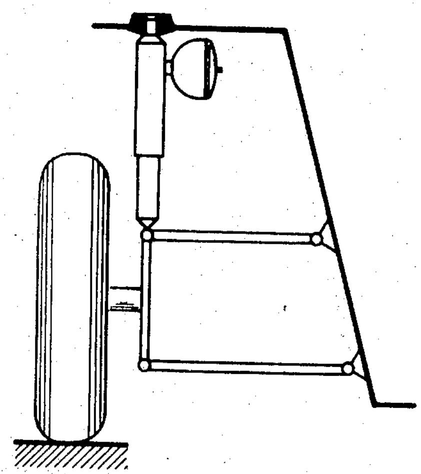
FIG. 1 is an elevational view diagrammatically illustrating a wheel suspension system embodying a joint according to the present invention.
Figure 2:
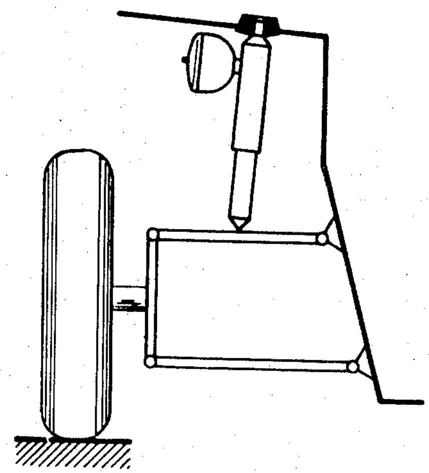
FIG. 2 is a view along the lines of FIG. 1 illustrating a conventional suspension system provided with two joints.
Figure 3:
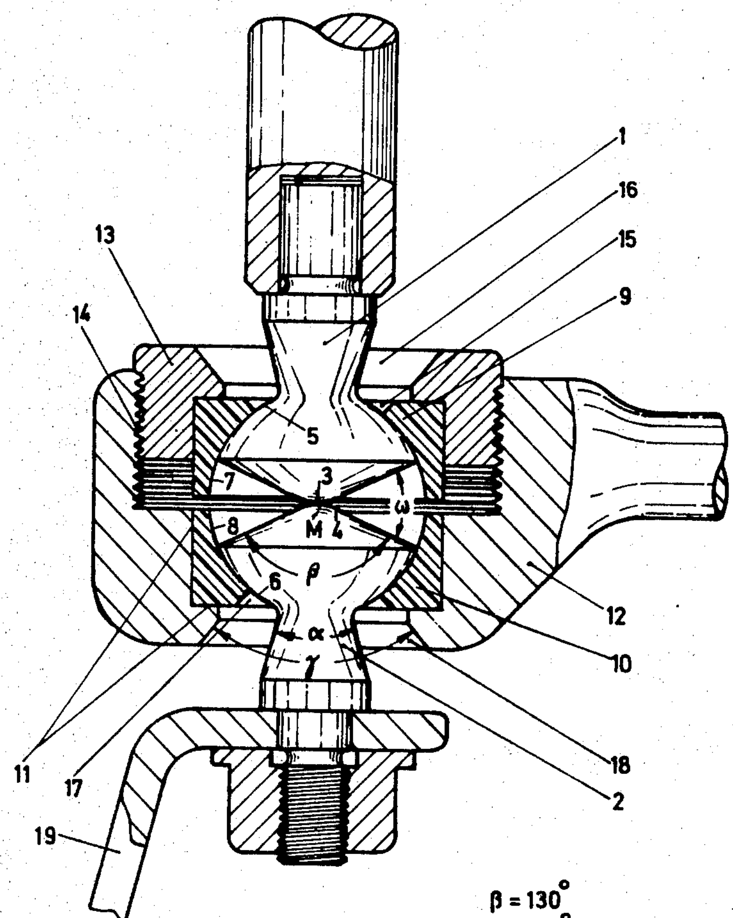
FIG. 3 is a fragmentary view in cross section of the components constituting a joint according to the invention.

Referring to FIG. 3, it will be noted that the joint assemblage includes two linkage components 1 and 2 and the ends of such components are substantially in the form of spherical sectors having apices constituting convex bearing bodies 3 and 4 respectively. The spherical portions of the sectors serve as guide faces 5 and 6 which are partly embraced or encased by bearing shells 9 and 10 and it will be noted that the shells 9 and 10 are formed with complementary spherical guide faces 7 and 8 respectively.

The bearing shell 10 is positioned in a recess 11 provided in a guide element or arm 12. The bearing shell 9 is held by a coupling nut 13 which is threaded into a threaded bore 14 formed in the guide element 12 and which bore 14 extends coaxially with respect to the recess 11. In order to allow a pivotal movement of the linkage components 1 and 2 with respect to each other and a pivotal movement of the guide element or arm 12 with respect to the linkage components 1 and 2, it will be noted that the bearing shell 9 and the coupling nut 13 are provided with conical bores 15 and 16 respectively and which bores taper outwardly. Furthermore, the bearing shell 10 and the guide element 12 are also provided with conical bores 17 and 18 respectively which taper outwardly.

The linkage component 2 is connected by means of a nut and bolt unit 20 with an arm 19 (not illustrated in detail) and to which arm a wheel axle is suitably secured. The linkage component 1 is operably connected as indicated at 21 to a piston 22 of a shock absorber unit.

The operation of the joint assemblage is as follows:

With the linkage components 1 and 2 being in alignment, the bearing bodies 3 and 4 touch each other at point M which, at the same time, serves as a center for the spherical guide faces 5 and 6 as well as the spherical guide faces 7 and 8 of the shells 9 and 10. It will be readily appreciated that in a rolling movement between the bearing bodies 3 and 4, and imaginary point on one of the moving parts describes an epicycloid and this means a total displacement of the moving part relative to the stationary part both in an axial direction and in a direction transverse thereto. In a joint completely free from play, such a movement would only be possible by a deformation of the bearing bodies 3 and 4 and/or the bearing shells 9 and 10 as well as the guide element 12. For proper operability of the joint assemblage, it is therefore necessary to permit a certain play and as can be determined from calculations, the necessary play is very small.

More specifically, with a radius of 5 mm. for the bearing bodies 3 and 4 without load, there is obtained, with angles of traverse between the linkage components 1 and 2 of the order of delta=20, 15 and 10 degrees, axial displacements of 0.150, 0.085 and 0.008 mm. and displacements transverse thereto of 0.026, 0.011 and 0.00 mm. With a flattening of the bearing bodies 3 and 4 by a load of 250 kp., the axial necessary play with steel is reduced to 0.102, 0.037 and 0.036 mm.

It can be seen from these values that the play is very small and with small angles is within the limits of the customary manufacturing tolerances. Dependent upon the load, it is even possible to pre-stress the joint assemblage with a certain force in the unloading state. The mobility of the guide element or arm 12 is limited only by its possible angle of traverse relative to the linkage components 1 and 2. In order to realize a possibly large angle of traverse, the apices of the cones corresponding to the conical bores 15, 16 and 17, 18 respectively (aperture angle gamma) are preferably positioned on the point M. In a like fashion, the linkage components 1 and 2 can be provided with a conical portion (aperture angle alpha), in order that a line contact is achieved during the traverse. If, there is selected, for example, that gamma=80 degrees and alpha=40 degrees there is obtained, starting from a center position, an angle of traverse of (gamma-alpha)/2=20 degrees in both directions. To insure that the guide faces 5, 6 are always sufficiently guided in such a traverse by the guide faces 7, 8 extreme care is exercised that the overlapping angle (beta-gamma)/2 is greater than the angle of traverse (gamma-alpha)/2. The maximum possible angle of traverse of the linkage components 1 and 2 with respect to each other is denoted epsilon and its value can be relatively small.

In view of the fact that the main component of the transmitted force extends in the axial direction of the linkage components 1 and 2, due to this low value and since only small transverse forces develop, the bearing shells 9 and 10 can be of a plastic material such as Teflon. For the same reason, there are only low frictional forces in view of the fact that the bearing bodies 3 and 4 roll off on one another. This rolling is always assured by a suitable dimensioning of the bodies 3 and 4 taking into account of course the angle of friction for small angles of traverse.

Irregularities can only result if the bearing bodies 3 and 4 lose their contact and this possibility can be effectively avoided by a suitable adjustment of the play or the initial stress by manipulation of the coupling nut 13. Hence, friction therefore appears only about the bearing shells 9 and 10 but due to the small transverse components, this friction remains low. It should further be mentioned that the shells 9 and 10 are also suitable for absorbing tensile forces since the same can appear or develop in a motor vehicle during expansion or with the vehicle in a jacked or elevated condition.

The invention is not to be confined to the precise showings illustrated in the drawings but changes or modifications may be made therein so long as such changes mark no material departure from the spirit and scope of the appended claims.

What I claim is:

1. A joint assemblage particularly for suspension systems of motor vehicles for the transmission of forces between linkage components which can be traversed relative to each other by small angles, in which the transmission of the forces is effected by a convex bearing body provided at the end of each linkage component which roll off or slide on opposing surfaces and a guide element capable of being turned through larger angles relative to the linkage components operably related to said linkage components for avoiding axial movement or bending of the linkage components, the improvement comprising said bearing bodies of said linkage components being provided with convex, spherical guide faces constituting parts of an imaginary sphere and said guide faces being partly embraced by corresponding concave spherical guide surfaces in said guide element.

2. The joint assemblage as claimed in claim 1 in which the center of the imaginary sphere with an alignment of the linkage components coincides with a contact point of said bearing bodies.

2. The joint assemblage as claimed in claim 1 in which two bearing shells are inserted in said guide element, said corresponding concave spherical guide faces being provided in said bearing shells, and coupling nut means cooperating with said guide element and one of said bearing shells for adjusting said one bearing shell.

4. The joint assemblage as claimed in claim 3 in which said bearing shells are of plastic material.

References Cited

UNITED STATES PATENTS

| | | | |
|---|---|---|---|
| 999,898 | 8/1911 | Stafford | 287—87 |
| 2,049,502 | 8/1936 | Hufferd et al. | 287—90 |
| 2,201,680 | 5/1940 | Haynes | 287—87 X |
| 2,544,582 | 3/1951 | Booth | 280—95 X |
| 2,614,862 | 10/1952 | Alldredge et al. | 287—87 X |

FOREIGN PATENTS

| | | |
|---|---|---|
| 1,121,947 | 1/1962 | Germany. |

KENNETH H. BETTS, Primary Examiner

U.S. Cl. X.R.

280—96.2